United States Patent
Cronin (10) Patent No.: US 11,004,058 B2
(45) Date of Patent: *May 11, 2021

(54) TRANSACTION MODIFICATION BASED ON REAL-TIME OFFERS

(71) Applicant: Blazer and Flip Flops, Inc., San Diego, CA (US)

(72) Inventor: John Cronin, Bonita Springs, FL (US)

(73) Assignee: Blazer and Flip Flops, Inc., San Diego, CA (US)

( * ) Notice: Subject to any disclaimer, the term of this patent is extended or adjusted under 35 U.S.C. 154(b) by 59 days.

This patent is subject to a terminal disclaimer.

(21) Appl. No.: 16/378,262

(22) Filed: Apr. 8, 2019

(65) Prior Publication Data

US 2019/0325426 A1   Oct. 24, 2019

Related U.S. Application Data

(63) Continuation of application No. 14/970,340, filed on Dec. 15, 2015, now Pat. No. 10,262,318.

(60) Provisional application No. 62/093,239, filed on Dec. 17, 2014.

(51) Int. Cl.
*G06Q 20/32* (2012.01)
*G06Q 20/20* (2012.01)
*G06Q 20/24* (2012.01)
*G06Q 40/02* (2012.01)

(52) U.S. Cl.
CPC ....... *G06Q 20/3278* (2013.01); *G06Q 20/202* (2013.01); *G06Q 20/204* (2013.01); *G06Q 20/24* (2013.01); *G06Q 20/322* (2013.01); *G06Q 40/025* (2013.01)

(58) Field of Classification Search
CPC ............. G06Q 20/3278; G06Q 20/322; G06Q 20/202; G06Q 20/204; G06Q 20/24; G06Q 40/025; G06Q 20/3223; G06Q 20/1085
USPC ........................................................ 705/17
See application file for complete search history.

(56) References Cited

U.S. PATENT DOCUMENTS

| | | |
|---|---|---|
| 5,473,143 A | 12/1995 | Vak et al. |
| 6,973,172 B1 | 12/2005 | Bitove et al. |
| 7,386,485 B1 | 6/2008 | Mussman et al. |
| 7,828,204 B2 | 11/2010 | Fiebiger et al. |
| 7,832,646 B1 | 11/2010 | Leason |
| 7,844,512 B2 | 11/2010 | Richards et al. |
| 8,065,190 B2 | 11/2011 | Collas et al. |
| 8,105,772 B2 | 4/2012 | Mardikar et al. |
| 8,306,860 B2 | 11/2012 | Dunsmore et al. |

(Continued)

FOREIGN PATENT DOCUMENTS

| | | |
|---|---|---|
| CN | 103679475 | 3/2014 |
| EP | 2 533 186 | 12/2012 |

(Continued)

OTHER PUBLICATIONS

Airplus—Mobile Payment—How It Will Transform Corporate Travel and Expense Management, Apr. 18, 2012.

(Continued)

*Primary Examiner* — Russell S Glass
(74) *Attorney, Agent, or Firm* — Polsinelli LLP (57) ABSTRACT

A mobile device corresponding to the present invention submits a credit application at a point of sale terminal, and a user of the mobile device receives credit that pays the merchant for a purchase made by the user at the merchant.

19 Claims, 10 Drawing Sheets

NFC-0012 : Real Time Credit Offers (56) References Cited

U.S. PATENT DOCUMENTS

| | | |
|---|---|---|
| 8,474,701 B1 | 7/2013 | Meek et al. |
| 8,494,913 B2 | 7/2013 | Cavagnaro |
| 8,498,900 B1 | 7/2013 | Spirin et al. |
| 8,577,803 B2 | 11/2013 | Chatterjee et al. |
| 8,690,054 B1 | 4/2014 | Cummins et al. |
| 8,714,439 B2 | 5/2014 | Brendell et al. |
| 8,718,554 B2 | 5/2014 | Abel |
| 8,762,211 B2 | 6/2014 | Killian et al. |
| 8,783,561 B2 | 7/2014 | Wesley |
| 8,788,324 B1 | 7/2014 | Shetty et al. |
| 8,799,085 B2 | 8/2014 | Fisher |
| 8,805,726 B2 | 8/2014 | Fisher |
| 8,811,895 B2 | 8/2014 | Reisgies et al. |
| 8,954,004 B1 | 2/2015 | Wang et al. |
| 9,582,826 B2 | 2/2017 | Calman et al. |
| 9,646,303 B2 | 5/2017 | Karpenko et al. |
| 9,672,511 B2 | 6/2017 | Lim |
| 9,734,091 B2 | 8/2017 | Kadi et al. |
| 9,985,699 B1 | 5/2018 | Cronin |
| 9,990,621 B1 | 6/2018 | Ng et al. |
| 10,204,335 B1 | 2/2019 | Donavalli et al. |
| 10,262,311 B1 | 4/2019 | Cronin |
| 10,262,318 B1 | 4/2019 | Cronin |
| 10,348,368 B2 | 7/2019 | Cronin |
| 10,516,964 B2 | 12/2019 | Dotan et al. |
| 10,580,011 B1 | 3/2020 | Cronin |
| 10,944,448 B2 | 3/2021 | Cronin |
| 2002/0026348 A1 | 2/2002 | Fowler et al. |
| 2002/0062249 A1 | 5/2002 | Iannacci |
| 2004/0010597 A1 | 1/2004 | Kirschner et al. |
| 2004/0220876 A1 | 11/2004 | Liu |
| 2005/0004839 A1 | 1/2005 | Bakker et al. |
| 2005/0210240 A1 | 9/2005 | Barron |
| 2006/0131390 A1 | 6/2006 | Kim |
| 2006/0206378 A1 | 9/2006 | Ficalora |
| 2007/0022375 A1 | 1/2007 | Walker |
| 2007/0032225 A1 | 2/2007 | Konicek et al. |
| 2007/0190939 A1 | 8/2007 | Abel |
| 2007/0192198 A1 | 8/2007 | Schwarzkopf |
| 2007/0203850 A1 | 8/2007 | Singh et al. |
| 2008/0011837 A1 | 1/2008 | Wesley |
| 2008/0078831 A1 | 4/2008 | Johnson et al. |
| 2008/0109335 A1 | 5/2008 | Keohane et al. |
| 2008/0120155 A1 | 5/2008 | Pliha |
| 2008/0133351 A1 | 6/2008 | White et al. |
| 2008/0147496 A1 | 6/2008 | Bal et al. |
| 2008/0150678 A1 | 6/2008 | Giobbi et al. |
| 2008/0167017 A1 | 7/2008 | Wentker et al. |
| 2008/0167961 A1 | 7/2008 | Wentker et al. |
| 2009/0082001 A1 | 3/2009 | Rahul et al. |
| 2009/0132362 A1 | 5/2009 | Fisher et al. |
| 2009/0138365 A1 | 5/2009 | Mueller et al. |
| 2009/0156190 A1 | 6/2009 | Fisher |
| 2009/0192935 A1 | 7/2009 | Griffin et al. |
| 2009/0276305 A1 | 11/2009 | Clopp |
| 2010/0010887 A1 | 1/2010 | Karlin et al. |
| 2010/0088149 A1 | 4/2010 | Sullivan et al. |
| 2010/0114677 A1 | 5/2010 | Carlson et al. |
| 2010/0124914 A1 | 5/2010 | Schmidt et al. |
| 2010/0125510 A1 | 5/2010 | Smith et al. |
| 2010/0190437 A1 | 7/2010 | Buhot |
| 2010/0211507 A1 | 8/2010 | Aabye et al. |
| 2010/0211679 A1 | 8/2010 | Kumar et al. |
| 2010/0274691 A1 | 10/2010 | Hammad et al. |
| 2010/0274853 A1 | 10/2010 | Carlson et al. |
| 2010/0309807 A1 | 12/2010 | Rautiainen |
| 2010/0312692 A1 | 12/2010 | Teicher |
| 2011/0016050 A1 | 1/2011 | Evans |
| 2011/0153438 A1 | 6/2011 | Dragt |
| 2011/0167133 A1 | 7/2011 | Jain |
| 2011/0202402 A1 | 8/2011 | Fowler et al. |
| 2011/0218849 A1 | 9/2011 | Rutigliano et al. |
| 2011/0230209 A1 | 9/2011 | Kilian |
| 2011/0238517 A1* | 9/2011 | Ramalingam .......... G06Q 20/40 705/26.1 |
| 2011/0258249 A1 | 10/2011 | Biggs et al. |
| 2011/0313922 A1 | 12/2011 | Ben Ayed |
| 2011/0320345 A1 | 12/2011 | Taveau et al. |
| 2012/0036076 A1 | 2/2012 | Vanderwall et al. |
| 2012/0078701 A1 | 3/2012 | Woods |
| 2012/0078735 A1 | 3/2012 | Bauer et al. |
| 2012/0089461 A1 | 4/2012 | Greenspan |
| 2012/0101882 A1 | 4/2012 | Todd |
| 2012/0109730 A1 | 5/2012 | Yoder et al. |
| 2012/0136732 A1 | 5/2012 | McMillen et al. |
| 2012/0148077 A1 | 6/2012 | Aldaz et al. |
| 2012/0160912 A1 | 6/2012 | Laracey |
| 2012/0166332 A1 | 6/2012 | Naaman |
| 2012/0185315 A1 | 7/2012 | VanDerheide et al. |
| 2012/0209749 A1 | 8/2012 | Hammad et al. |
| 2012/0221401 A1 | 8/2012 | Brown et al. |
| 2012/0253913 A1 | 10/2012 | Richard |
| 2012/0330744 A1 | 12/2012 | Aissa |
| 2013/0006773 A1 | 1/2013 | Lutnick et al. |
| 2013/0006782 A1 | 1/2013 | Schwarzkopf et al. |
| 2013/0020389 A1 | 1/2013 | Barnett |
| 2013/0059534 A1 | 3/2013 | Sobalvarro et al. |
| 2013/0067546 A1 | 3/2013 | Thavasi et al. |
| 2013/0080241 A1 | 3/2013 | Fisher |
| 2013/0080972 A1 | 3/2013 | Moshrefi et al. |
| 2013/0085835 A1 | 4/2013 | Horowitz |
| 2013/0095755 A1 | 4/2013 | Moreton et al. |
| 2013/0097040 A1 | 4/2013 | Fisher |
| 2013/0110261 A1 | 5/2013 | Lee et al. |
| 2013/0110682 A1 | 5/2013 | Rosenblatt et al. |
| 2013/0132282 A1 | 5/2013 | Shakkarwar |
| 2013/0144715 A1 | 6/2013 | Kranzley et al. |
| 2013/0191213 A1 | 7/2013 | Beck et al. |
| 2013/0191246 A1 | 7/2013 | Calman et al. |
| 2013/0204728 A1 | 8/2013 | Lichterman et al. |
| 2013/0211987 A1 | 8/2013 | Louie et al. |
| 2013/0215467 A1 | 8/2013 | Fein et al. |
| 2013/0218682 A1 | 8/2013 | Alterman et al. |
| 2013/0256403 A1* | 10/2013 | MacKinnon Keith ...................... G06Q 20/42 235/375 |
| 2013/0268378 A1 | 10/2013 | Yovin |
| 2014/0006205 A1 | 1/2014 | Berry et al. |
| 2014/0006272 A1 | 1/2014 | Calman et al. |
| 2014/0058955 A1 | 2/2014 | Calman |
| 2014/0074637 A1 | 3/2014 | Hammad |
| 2014/0074691 A1 | 3/2014 | Bank et al. |
| 2014/0081855 A1 | 3/2014 | Hankins et al. |
| 2014/0089178 A1 | 3/2014 | Lee et al. |
| 2014/0089672 A1 | 3/2014 | Luna et al. |
| 2014/0100983 A1 | 4/2014 | Cavagnaro |
| 2014/0129357 A1 | 5/2014 | Goodwin |
| 2014/0138435 A1 | 5/2014 | Khalid |
| 2014/0172660 A1 | 6/2014 | Louie et al. |
| 2014/0173063 A1 | 6/2014 | Jeong et al. |
| 2014/0180826 A1 | 6/2014 | Boal |
| 2014/0189836 A1 | 7/2014 | Eyler |
| 2014/0201085 A1 | 7/2014 | Brendell et al. |
| 2014/0207680 A1 | 7/2014 | Rephlo |
| 2014/0214673 A1 | 7/2014 | Baca et al. |
| 2014/0222670 A1 | 8/2014 | Concannon |
| 2014/0274014 A1 | 9/2014 | Dodla |
| 2014/0277805 A1 | 9/2014 | Browne et al. |
| 2014/0279474 A1 | 9/2014 | Evans et al. |
| 2014/0298027 A1 | 10/2014 | Roberts et al. |
| 2014/0330654 A1 | 11/2014 | Turney et al. |
| 2014/0337151 A1* | 11/2014 | Crutchfield .......... G06F 1/1601 705/17 |
| 2014/0351057 A1 | 11/2014 | Kwon et al. |
| 2014/0351071 A1 | 11/2014 | Hong et al. |
| 2014/0351147 A1 | 11/2014 | Castrechini et al. |
| 2015/0019439 A1 | 1/2015 | Phillips |
| 2015/0073907 A1 | 3/2015 | Purves et al. |
| 2015/0088626 A1 | 3/2015 | Salmon et al. |
| 2015/0088631 A1 | 3/2015 | Mitchell |
| 2015/0095224 A1 | 4/2015 | Blythe |
| 2015/0100443 A1* | 4/2015 | Van Heerden ...... G06Q 40/025 705/16 |
| 2015/0100803 A1 | 4/2015 | Chen et al. |

(56) References Cited

U.S. PATENT DOCUMENTS

| | | | |
|---|---|---|---|
| 2015/0120473 | A1 | 4/2015 | Jung et al. |
| 2015/0127549 | A1 | 5/2015 | Khan |
| 2015/0154634 | A1 | 6/2015 | Chiu et al. |
| 2015/0156311 | A1 | 6/2015 | Adams et al. |
| 2015/0186871 | A1 | 7/2015 | Laracey |
| 2015/0220915 | A1 | 8/2015 | Rosenberg |
| 2015/0302398 | A1 | 10/2015 | Desai et al. |
| 2015/0339318 | A1 | 11/2015 | O'Toole et al. |
| 2015/0356551 | A1 | 12/2015 | Dogin et al. |
| 2016/0055512 | A1 | 2/2016 | Godsey et al. |
| 2016/0057619 | A1 | 2/2016 | Lopez |
| 2016/0117667 | A1 | 4/2016 | Kang et al. |
| 2016/0125414 | A1* | 5/2016 | Desai ............... G06Q 20/4014 705/17 |
| 2016/0162882 | A1 | 6/2016 | McClung |
| 2016/0192123 | A1 | 6/2016 | Lim |
| 2016/0321641 | A1 | 11/2016 | Cady et al. |
| 2017/0024733 | A1 | 1/2017 | Purves |
| 2017/0287321 | A1 | 10/2017 | Ann et al. |
| 2017/0295032 | A1 | 10/2017 | Shin et al. |
| 2018/0041591 | A1 | 2/2018 | Yoden |
| 2018/0050450 | A1 | 2/2018 | Parrott et al. |
| 2018/0248589 | A1 | 8/2018 | Cronin |
| 2018/0374073 | A1 | 12/2018 | Zhao |
| 2019/0050895 | A1 | 2/2019 | Levy |
| 2019/0172035 | A1 | 6/2019 | Cronin |
| 2019/0326957 | A1 | 10/2019 | Cronin |

FOREIGN PATENT DOCUMENTS

| | | |
|---|---|---|
| WO | WO 2012/051071 | 4/2012 |
| WO | WO 2013/096486 | 6/2013 |

OTHER PUBLICATIONS

Case Study—Bill Splitting App for Restaurants, 2013.
AuthenTec—AuthenTec Fingerprint Technology Featured in Two New Fujitsu NFC-enabled Mobile Phones from NTT Docomo, Nov. 16, 2011.
Balaban, Dan; "Spanish Bank Installs 'First' Contactless ATMs", NFC Times, Apr. 5, 2011.
Blaze Mobile Wallet, Jan. 2008.
Boden, Rian; "PrivatBank cuts ATM costs with NFC", NFC World, Nov. 5, 2013.
Borison, Rebecca; "Google Wallet adds geolocated loyalty to iOS, combats Passbook", Mobile Commerce Daily, Feb. 7, 2014.
Carson, Biz; "BitPay brings one-touch payments to bitcoin with new NFC-compatible checkout app." Nov. 4, 2014.
Cluckey, Suzanne; "New guide offers a comprehensive view of ATM and mobile integration", Mobile Payments Today, Nov. 28, 2014.
CommBank Small Business app User Guide, CommonwealthBank. Jul. 11, 2014.
Dai, Weihui; "An Integrated Mobile Phone Payment System Based on 3G Network", Journal of Networks, vol. 6, No. 9, Sep. 2011.
Dragt, Bruce; "Universal Commerce: A Seamless, Personalized Purchase Experience for Today's Connected Consumers", A First Data White Paper, 2012.
Fraser, Jeff; "The Mobile Shopper: Lose Your Wallet." Jun. 1, 2014.
Girt Mobile—Mobile Application Development Ireland, Dec. 2, 2014.
Google Wallet Privacy Policy, Nov. 16, 2011.
HOYOS LABS, Nov. 28, 2014.
i-Free Unveils New and Improved "Wallet": NFC Mobile App Now Stores Contactless Transport Cards and Discount Coupons, i-Free News, Nov. 7, 2013.
FAQ and Support—CashCloud.com, Dec. 3, 2014.
Itautec Mobicash, Feb. 13, 2013. Link: https://youtu.be/-qaL2QHliok (youtube video, no pdf).
Khan, Vaseem; "Contactless card reader by Diebold leverages NFC technology at ATM's to give cash", NFC, Payments, Oct. 10, 2013.
Keane, Byran; "Key Takeaways From Money2020 Industry Conf", Deutsche Bank Markets Research. Oct. 10, 2013.
Lawler, Ryan; "Square's Order App Can Now Predict When You'll Arrive to Pick Up Your Cappuccino", TechCrunch, Oct. 8, 2014.
Ma et al., Xiaohua; "The Architecture of Mobile Wallet System Based on NFC (Near Field Communication)", Research Journal of Applied Sciences, Engineering and Technology 7(12): 2589-2595, 2014, ISSN: 2040-7459; e-ISSN: 2040-7467, Mar. 29, 2014.
Mastin, Michelle; "Square vs.. Intuit GoPayment: Mobile Credit Card Systems Compared", BIZFEED, PCWorld, Sep. 6, 2011.
Mobile_Commerce_NFC_Coupons_and_Loyalty_Acceptance— Technical Proposal, Version 1.0, Jul. 1, 2014.
More Magic: Mobile Banking & Payment Applications, Nov. 30, 2014.
NEC—Integrated E-Money Solution, Jan. 20, 2014.
"New breed of ATM Visits Times Square", Mobileinfo.com, Issue #2001, Jul. 30, 2001.
NFC & Contactless—Mobile and card solutions, NFC & Mobile Money Summit, Oct. 14-17, 2013.
NFC ReTag FREE—WidgApp Mobile Solutions Tools, Google Play, Jul. 17, 2014.
NFC White Paper—Alcatel-Lucent Mobile Wallet Service, Dec. 2011.
NXP—NFC for embedded applications: Your Critical link for the Internet of Things, Aug. 21, 2014.
Patni, Chandra; "Pouch NFC PayPass & PayWave Card Issuance, pouch-let your mobile pay!", www.yes-wallet.com, Apr. 13, 2012.
"Pay2You Places: shopping by geolocation", Connexions, Jul. 5, 2013.
Pourghomi et al., Pardis; "Cloud-based NFC Mobile Payments", Journal of Internet Technology and Secured Transactions (JITST), vol. 2, Issues 1/2/3/4, Mar.-Dec. 2013.
Pourghomi et al., Pardis; "A Proposed NFC Payment Application", International Journal of Advanced Computer Science and Applications, vol. 4, No. 8, 2013).
Reardon, Marguerite; Tibken, Shara; "Apple takes NFC maintstream on iPhone 6; Apple Watch with Apple Pay", CNET, Sep. 9, 2014.
Rodrigues et al., Helena; "MobiPag: Integrated Mobile Payment, Ticketing and Couponing Solution Based on NFC", Sensors 2014, 14, 13389-13415;ISSN 124-8220, Jul. 24, 2014.
Sreekumar, Shiny; "Biometric Authentication in Mobile Payments", Master Thesis, Information Management, Faculty of Computer Sciences, Sep. 2010.
Tamas, Fabian; "NFC-enabled Automated Teller Machine", Obuda University, NIK. Nov. 28, 2014.
TapWise—Near Field Communication (NFC) Services and Cloud-Based Tag Management, Dec. 1, 2014.
VoxLoc—Mastercard announces high level of success with biometric system. Sep. 23, 2014.
White Paper—Beyond The Hype: Mobile Payments for Merchants, 2013.
White Paper—Cloud Based Ticketing: Next Generation Fare Collection, Mar. 23, 2014.
White Paper—Mobile Commerce in Retail: Loyalty and Couponing, Jan. 2014.
White Pater—The Role of the Trusted Service Manager in Mobile Commerce, Dec. 2013.
Wollenhaupt, Gary; "Five Ways Mobile Technology will Revolutionize ATMs", White Paper ATM MarketPlace, 2013.
U.S. Appl. No. 14/970,304 Final Office Action dated Oct. 1, 2018.
U.S. Appl. No. 14/970,304 Office Action dated Jan. 12, 2018.
U.S. Appl. No. 14/970,311 Final Office Action dated Jun. 13, 2019.
U.S. Appl. No. 14/970,311 Office Action dated Apr. 4, 2018.
U.S. Appl. No. 14/970,314 Office Action dated Mar. 8, 2018.
U.S. Appl. No. 14/970,319 Final Office Action dated Jan. 28, 2019.
U.S. Appl. No. 14/970,319 Office Action dated Jun. 26, 2018
U.S. Appl. No. 14/970,328 Office Action dated Feb. 14, 2018
U.S. Appl. No. 14/970,056 Final Office Action dated Nov. 2, 2018.
U.S. Appl. No. 14/970,056 Office Action dated Apr. 5, 2018.
U.S. Appl. No. 14/970,069 Office Action dated Mar. 28, 2018.
U.S. Appl. No. 14/970,080 Final Office Action dated Sep. 21, 2018.

(56) References Cited

OTHER PUBLICATIONS

U.S. Appl. No. 14/970,080 Office Action dated Feb. 26, 2018.
U.S. Appl. No. 14/970,091 Office Action dated Jun. 1, 2018.
U.S. Appl. No. 14/970,102 Final Office Action dated Nov. 30, 2017.
U.S. Appl. No. 14/970,102 Office Action dated May 1, 2017.
U.S. Appl. No. 15/967,068 Office Action dated Sep. 4, 2018.
U.S. Appl. No. 14/970,338 Final Office Action dated Jan. 25, 2019.
U.S. Appl. No. 14/970,338 Office Action dated Jun. 28, 2018.
U.S. Appl. No. 14/970,340 Office Action dated Apr. 5, 2018.
U.S. Appl. No. 14/970,125 Final Office Action dated Jan. 28, 2019.
U.S. Appl. No. 14/970,125 Office Action dated Jun. 29, 2018.
U.S. Appl. No. 14/970,139 Final Office Action dated Jan. 18, 2019.
U.S. Appl. No. 14/970,139 Office Action dated May 31, 2018.
U.S. Appl. No. 14/970,144 Final Office Action dated Jan. 7, 2019.
U.S. Appl. No. 14/970,144 Office Action dated May 17, 2018.
U.S. Appl. No. 14/970,304, John Cronin, NFC Transaction Choices, filed Dec. 15, 2015.
U.S. Appl. No. 14/970,311, John Cronin, NFC Triggered Incentives at Point-of-Sale, filed Dec. 15, 2015.
U.S. Appl. No. 14/970,319, John Cronin, NFC ATM Vending Machine With Added Two Way Non-Financial Data, filed Dec. 15, 2015.
U.S. Appl. No. 14/970,080, John Cronin, NFC Increased Biometrics Based on Transactions Parameters, filed Dec. 15, 2015.
U.S. Appl. No. 14/970,338, John Cronin, Payment Processes With Warranty Options, filed Dec. 15, 2015.
U.S. Appl. No. 14/970,125, John Cronin, NFC Transaction With Financial and Non-Financial Data, filed Dec. 15, 2015.
U.S. Appl. No. 14/970,139, John Cronin, Bill Splitting and Account Delegation for NFC, filed Dec. 15, 2015.
U.S. Appl. No. 14/970,144, John Cronin, Automatic Shopping Based on Historical Data, filed Dec. 15, 2015.
U.S. Appl. No. 14/970,304 Office Action dated Jul. 12, 2019.
U.S. Appl. No. 14/970,311 Office Action dated Oct. 2, 2019.
U.S. Appl. No. 14/970,319 Office Action dated Jul. 10, 2019.
U.S. Appl. No. 14/970,080 Office Action dated Aug. 15, 2019.
U.S. Appl. No. 16/808,220, John Cronin, NFC-Based Options Selection, filed Mar. 3, 2020.
Reuter, Thad; "NFC 'Add-On' Links Smart Phones, Contactless Pay", Paris Start-up Technology Vendor, ATM & Debit News. (Years: 2009).
"The Mobile Payments and NFC Landscape: A U.S. Perspective", A Smart Card Alliance Payments Council White Paper, Publication No. PC-11002 (Year: Sep. 2011).
U.S. Appl. No. 16/503,358 Office Action dated Jan. 7, 2020.
U.S. Appl. No. 16/503,358, John Cronin, Managing NFC Devices Based on Downloaded Data, filed Jul. 3, 2019.
Alliance, Smart Card. "The mobile payments and NFC landscape: A US perspective." Smart Card Alliance (Sep. 2011): 1-53.
U.S. Appl. No. 14/970,304 Office Action dated Mar. 18, 2021.

\* cited by examiner

NFC-0012 : Real Time Credit Offers

Mobile Device Real Time Credit Software

[Inside SO]

- Mobile Wallet GUI -

Select Options
Normal Credit Card Processing
☐ Visa
☐ Master Card
☐ American Express

Request Real Time Credit Offers
☐ From Merchant
☐ From Merchant Bank
☐ Out For Bid - Credit Card Payer
☐ Micro Financing

[Profile]

Real Time Credit Offer

Home Depot Credit Card — [OK to Use]

Local Bank XXX — [ ]

Best Bidder YYY — [ ]

Micro Financing ZZZ — [ ]

TRANSACTION MODIFICATION BASED ON REAL-TIME OFFERS

CROSS-REFERENCE TO RELATED APPLICATIONS

This application is a continuation of U.S. application Ser. No. 14/970,340 filed Dec. 15, 2015, now U.S. Pat. No. 10,262,318, which claims the priority benefit of U.S. provisional application No. 62/093,239 filed Dec. 17, 2014 entitled "Real Time Credit Offers," the disclosures of which are hereby incorporated by reference.

BACKGROUND OF THE INVENTION

1. Field of the Invention

The present invention generally relates to near field communications (NFC). More specifically, the present invention relates to a mobile electronic device equipped with a near field data communication interface that is provided with an offer to receive credit from a financial institution while shopping at a merchant.

2. Description of the Related Art

Near field data communications (NFC) are currently being used by consumers to make secure financial transactions when purchasing goods or services. NFC is a standardized wireless data communication technology that communicates information over short distances. NFC commonly communicates using a frequency of 13.56 megahertz (MHz) with data rates approaching 424 kilo-bits per second (Kb/sec). NFC equipped devices of various sorts are available in the marketplace today. Today smartphones and mobile devices using NFC are commonly used to make payments using information identifying credit cards, debit cards, and loyalty cards.

NFC devices currently do not allow for submission of a credit application and receipt of credit from a financial institution when making a purchase at a merchant. Since users of mobile devices would benefit from being able to submit a credit application and receive credit from a financial institution concurrent with purchase of a good in real time, there is a need in the art for a system and a method where a user of a mobile device submits a credit application using NFC data communications and receives credit for purchasing an item at the time the item is being purchased.

SUMMARY OF THE PRESENTLY CLAIMED INVENTION

Embodiments of the present invention include a system and a method for a user of a mobile electronic device to submit a credit application and receive credit in real time. The mobile device may be equipped with a near field communication (NFC) data communication interface and a graphical user interface (GUI) displayed on a display at the mobile device. The mobile device may receive an input through the GUI indicating that a user of the mobile device wishes to submit a request to receive credit when making a purchase at a merchant. The mobile device, after receiving the input, may transmit the request to a point of sale terminal at the merchant using the NFC data communication interface at the mobile device. The request transmitted may include information about the request and/or may include an email address of the user.

The user may receive a response to the request that includes a link such as a universal resource locator (URL). The user may then select the link that may direct the user mobile device to open and display a credit application in the GUI. After completing the credit application displayed in the GUI, information relating to the credit application may then be transmitted over the NFC data communication interface to the point of sale terminal. The point of sale terminal may forward the credit application to one or more credit providers.

A credit provider may agree to provide credit to the user for purchasing the item. The credit provider that agreed to provide the credit then pays the merchant for the purchase and the mobile device may then receive a message indicating that the request for credit has been accepted and that the purchase has been completed.

DETAILED DESCRIPTION

Embodiments of the present invention include a system and a method for a user of a mobile electronic device to submit a credit application and receive credit in real time.

Mobile electronic devices described herein include, yet are not limited to smartphones, iPhones, Android phones, iPads, notebook computers, computers built into a car, and mobile devices dedicated to performing NFC communications.

The various methods may be performed by software operating in conjunction with hardware. For example, instructions executed by a processor, the instructions otherwise stored in a non-transitory computer readable medium such as memory. Various interfaces may be implemented—both communications and interface. One skilled in the art will appreciate the various requisite components of a mobile device and integration of the same with one or more of the figures and/or descriptions included herein.

Systems that provide real time credit to customer of a merchant described herein may be implemented in software installed on a computer, or a computer sever. The computer or computer server may communicate with a computer at the merchant or may communicate directly with a merchant point of sale terminal located at the merchant.

Figure 1:
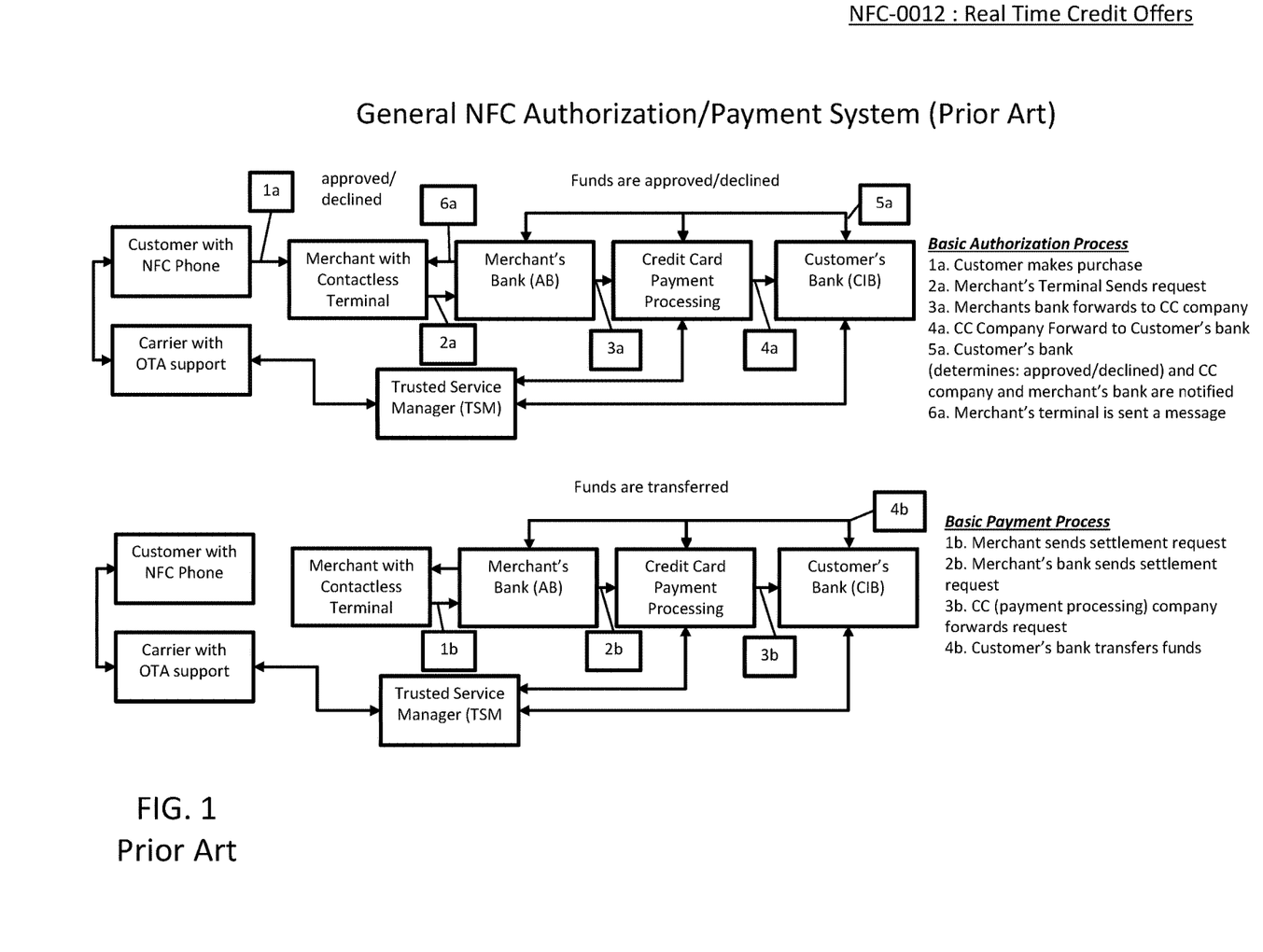
FIG. 1 illustrates a prior art basic authorization process and a prior art payment process.

FIG. 1 illustrates a prior art basic authorization process and a prior art payment process. FIG. 1 illustrates two separate flow charts, a first flow chart of a prior art basic authorization process, and a second flow chart of a basic prior art payment process. The basic authorization process begins with a customer with a phone that supports NFC communications sending a purchase order 1a to a merchant with a contactless terminal. The merchant with the contactless terminal then sends a request 2a to the merchant bank. Next the merchant bank forwards credit card information 3a provided with the purchase order to a credit card payment processing center. The credit card payment processing center then forwards the credit card information 4a to the customer bank, and the customer bank approves or declines the purchase 5a. Next a message is sent back to the merchant 6a indicating that the purchase has been approved or declined.

FIG. 1 also indicates that funds are approved or declined using a combination of the merchant bank, the credit card payment processing center, and the customer bank. FIG. 1 also depicts alternate communication pathways for performing the transactions. The alternative communication pathway includes a trusted service manager (TSM) communicating with the customer bank, and with the credit card payment processing center. The TSM is an entity that serves a trusted intermediary between mobile devices, networks that service mobile devices, and software applications. The TSM securely coordinates payments from a financial institution to a merchant that have been authorized by a mobile device. The alternate pathway also includes a carrier with over the air (OTA) support communicating with the TSM and with the customer phone. Examples of a carrier with OTA support are cellular companies like Verizon, AT&T, and T-Mobile. The basic authorization process may be performed using older phone lines, or it may be performed using modern wireless cellular networks.

The basic payment process of FIG. 1 illustrates the merchant sending a settlement request 1b to the merchant bank, the merchant bank then sends a settlement request 2b to the customer bank. Then the credit card payment processing company forwards the request 3b. Next, the customer bank transfers funds to the merchant bank 4b. FIG. 1 shows that communications between the merchant bank, the credit card payment processing center, and the customer bank are used to transfer from the customer bank to the merchant bank. The basic payment flow chart also shows a customer phone communicating with a carrier with OTA support and with a TSM. Here the TSM also communicates with the credit card payment system and with the customer bank.

Figure 2:
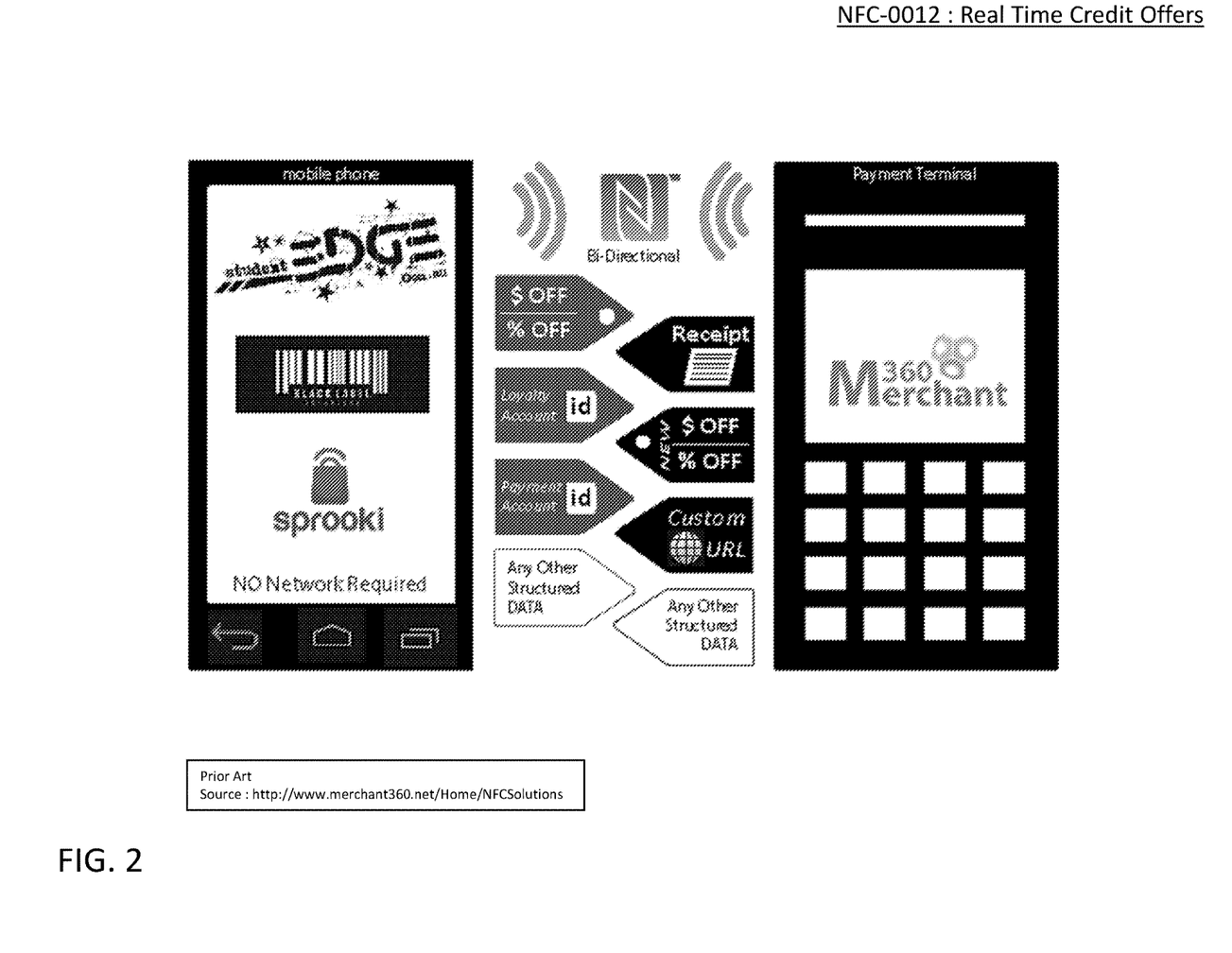
FIG. 2 illustrates prior art electronic devices communicating using NFC data communications.

FIG. 2 illustrates prior art electronic devices communicating using NFC data communications. FIG. 2 shows merchant software installed on a payment terminal. FIG. 2 also illustrates the payment terminal communicating with a mobile electronic devices. NFC communications transferred between the payment terminal and the mobile device include dollar ($) off a purchase, a percentage (%) off a purchase, a receipt, a loyalty account identifier (ID), a payment account ID, a custom universal resource locator (URL), and other structured data.

Figure 3:
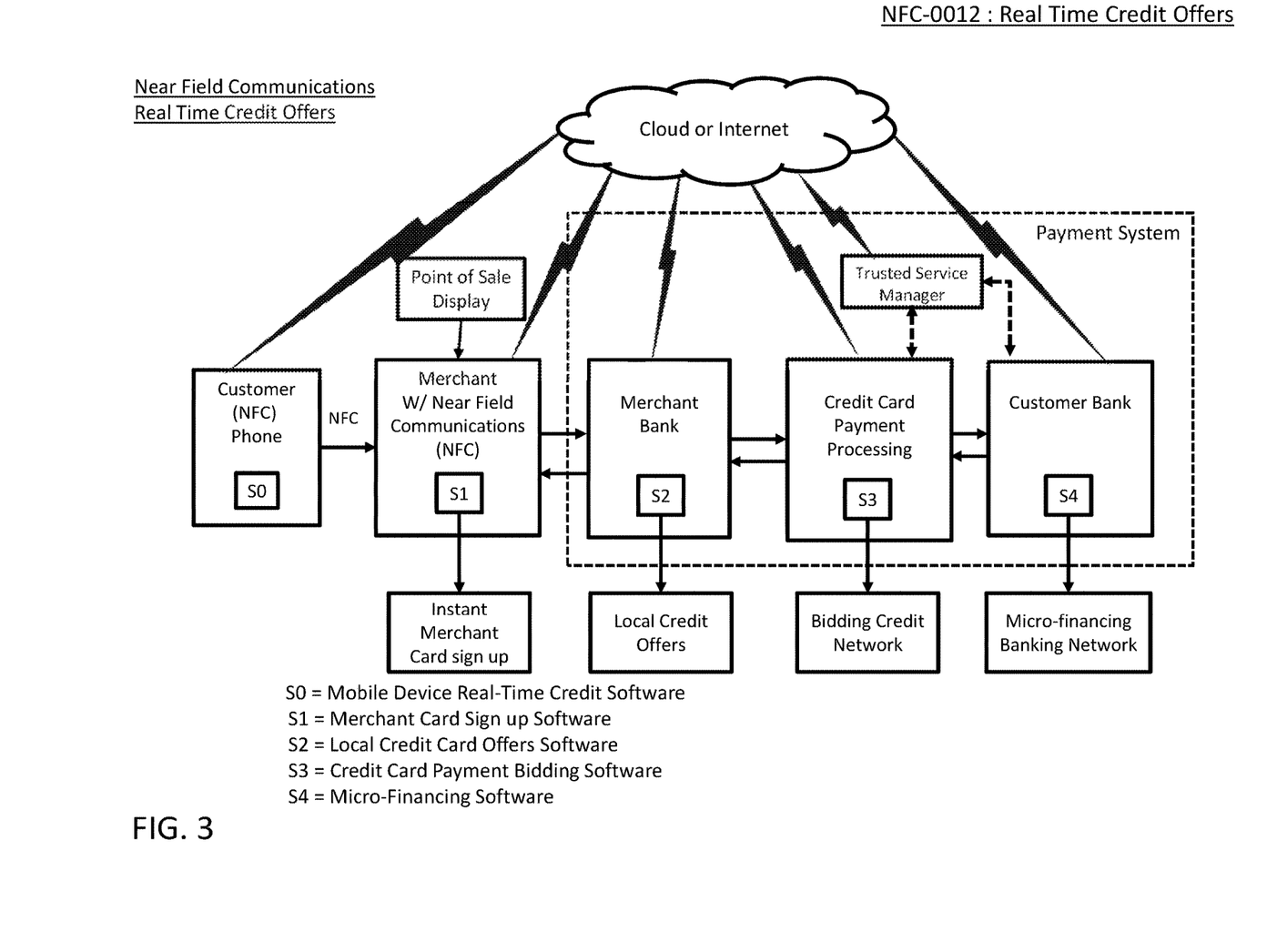
FIG. 3 illustrates a customer NFC enabled phone communicating with a NFC terminal at a merchant.

FIG. 3 illustrates a customer NFC enabled phone communicating with a NFC terminal at a merchant. FIG. 3 also illustrates the customer NFC enabled phone communicating with a payment system over the cloud or internet. FIG. 3 includes a customer phone including mobile device real time credit software S0. FIG. 3 also includes a merchant NFC enabled system, a point of sale display at the merchant, an instant merchant card sign up system at the merchant and a payment system. The merchant system includes merchant card sign up software S1.

The payment system includes a merchant bank system, a trusted service manager system, a credit card payment processing center, and a customer bank system. The merchant bank system includes local credit card offers software S2. The merchant bank system is shown communicating or including local credit offers. The credit card payment processing system includes a credit card payment bidding software S3. The payment processing system is shown communicating with or including a bidding credit network. The customer bank system includes micro-financing software S4. The customer bank system is shown as communicating with or including a micro-financing banking network.

Figure 4:
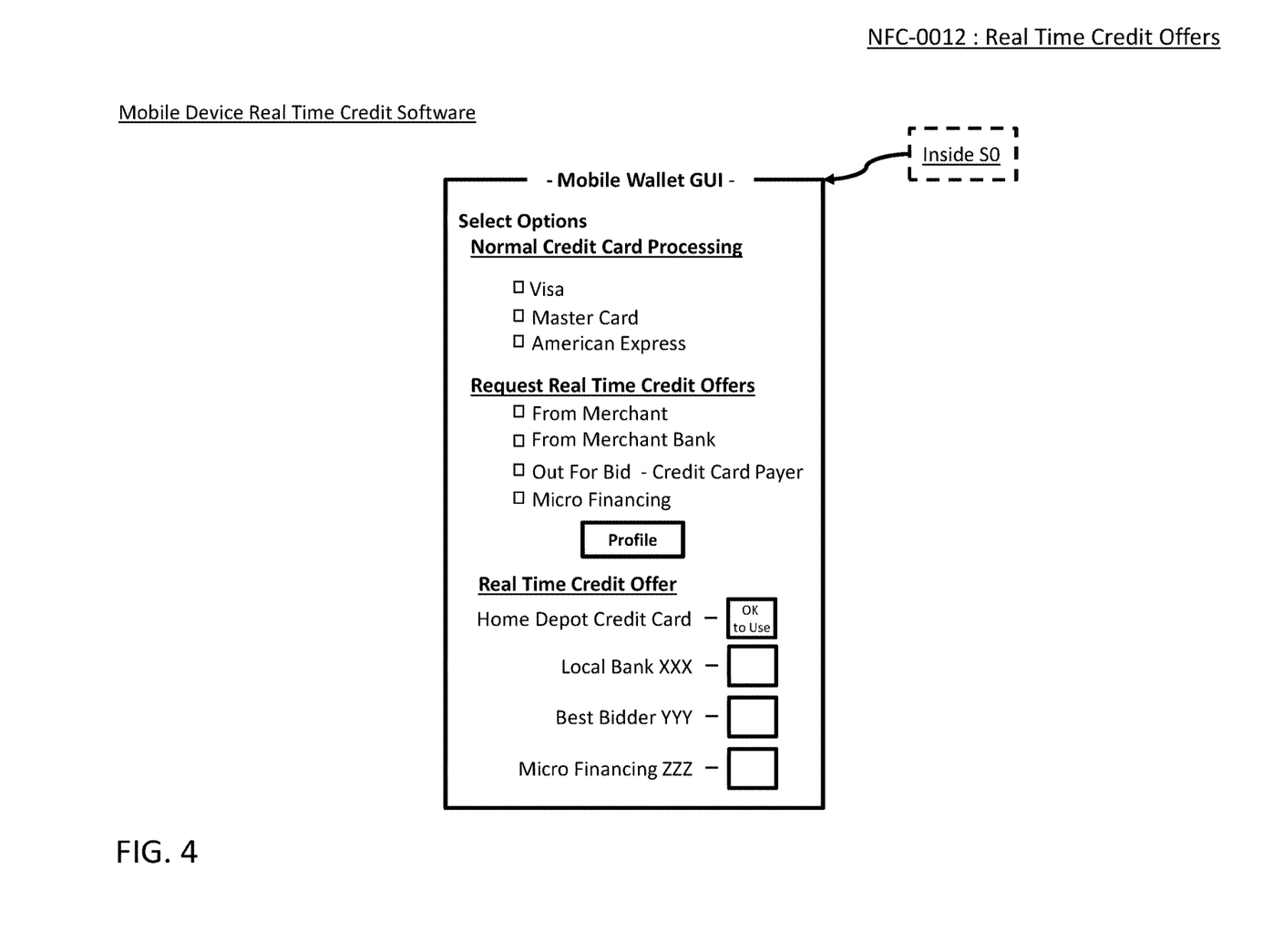
FIG. 4 illustrates a mobile wallet graphical user interface (GUI) that may be displayed on a mobile device.

FIG. 4 illustrates a mobile wallet graphical user interface (GUI) that may be displayed on a mobile device. The GUI includes a plurality of selection options relating to normal credit card processing, requesting real time credit offers, and other real time credit offerings. FIG. 4 includes a profile selection box that, when selected, may allow an individual to enter information about themselves such as a name, an address, an email address, or a phone number.

Selection boxes under normal credit cards include VISA, Master Card, and American Express. Selection boxes under request for real time credit offers include a "from merchant" selection box, a "from merchant bank" selection box, an "out for bid-credit card" selection box, and a "micro-financing selection box." Selection boxes under real time credit offer include a Home Depot selection box, a local bank selection XXX box, a best bidder YYY selection box, and a micro financing ZZZ selection box. The Home Depot selection box indicates that the Home Depot credit card is OK to use. FIG. 4 also indicates that the GUI is located inside of software S0.

Figure 5:
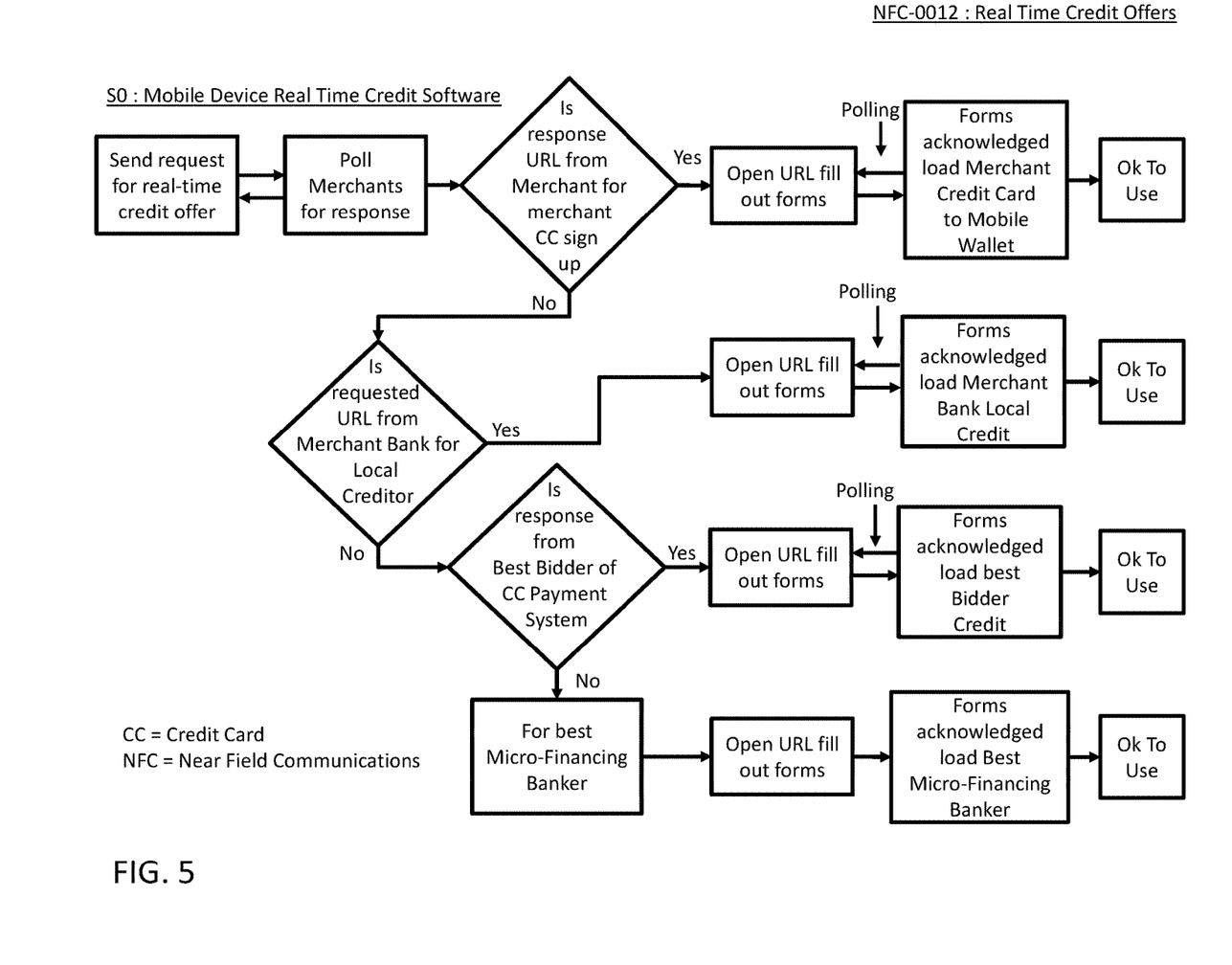
FIG. 5 illustrates an exemplary method that may be performed by real time credit software on a mobile device.

FIG. 5 illustrates an exemplary method that may be performed by real time credit software on a mobile device. A first step of the method of FIG. 5 is a step where a request for a real time credit offer is sent from a mobile device. Next, the mobile device polls merchants for a response to the request. The third step in the method of FIG. 5 is a determination whether a response URL from a merchant credit card (CC) sigh up has been received. When yes, the program flow moves to a fourth step that opens the URL and where forms may be filled out. Next, in a fifth step, the program flow moves to a step where the forms are uploaded to a merchant system and an acknowledgement is received. The fifth step may allow mobile device to receive a merchant credit card that may be downloaded to the mobile device. Next, in a sixth step, the merchant credit card is OK to use.

When the determination box in step three has not received a response, the program flow moves to another determination box in step seven of the flow chart. When a URL from a merchant bank has been received, the URL is opened and forms are filled out. Next, in an eighth step, the forms are uploaded to the local merchant bank (in a ninth step) and an acknowledgement is sent to the mobile device indicating that it is OK to use a credit line from the local merchant bank in a tenth step.

When the determination box in the seventh step has not received a response, the program flow moves to another determination box in step eleven of the flow chart. When a URL from a best bidder has been received, the URL is opened and forms are filled out in a twelfth step. Next, in an thirteenth step, the forms are uploaded to the best bidder and an acknowledgement is sent to the mobile device indicating that it is OK to use a credit line from the best bidder in a fourteenth step.

When the determination box in step eleven has not received a response, the program flow moves to step fifteen where a best micro-financing banker URL is accessed. Next, in step 16, the forms are uploaded to the best micro-financing banker and an acknowledgement is sent to the mobile device indicating that it is OK to use a credit line from the best micro-financing banker.

Figure 6:
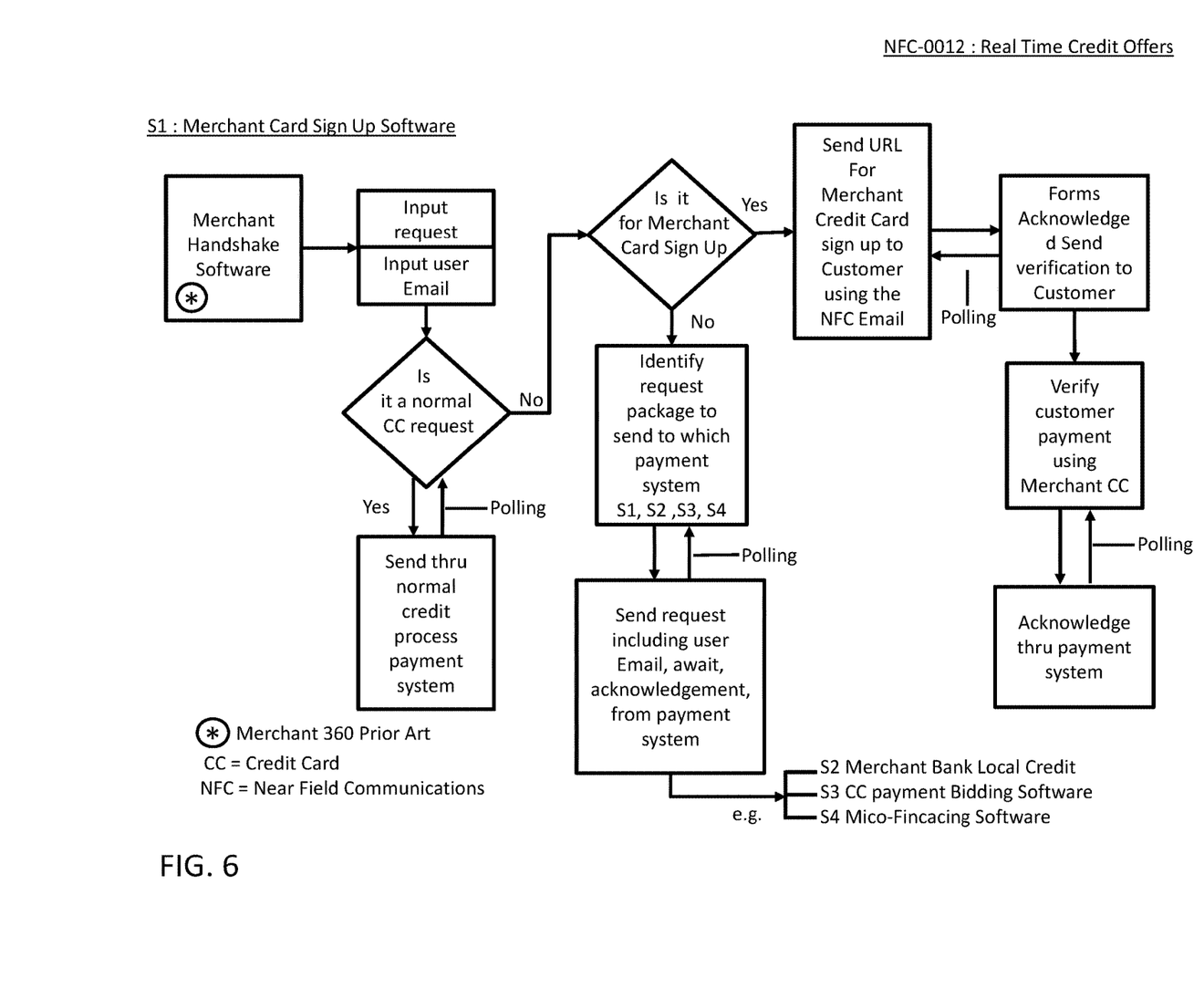
FIG. 6 illustrates an exemplary card sign up methodology.

FIG. 6 illustrates an exemplary card sign up methodology. In a first step of the method of FIG. 6, merchant handshake software and a mobile device may initiate a communication over a NFC data communication interface. In a second step of the method of FIG. 6, an input request is received by the merchant card sign up software that includes a user email address. Next, in step three of the method of FIG. 6, a determination is made as to whether the request is a normal credit request. When the request is a normal credit request, program flow moves to the fourth step of the method where the request is sent to a normal credit process payment system that processes the request.

When step three of the method of FIG. 6 determines that the credit card request is not normal, the program flow moves to a second determination step where a determination is made as to whether the request is for a merchant card sign up. When the credit request is for a merchant card sign up, the program flow moves to a sixth step. The sixth step of the method of FIG. 6 sends a URL for the merchant CC sign up back to a mobile device of the requestor. Next, in a seventh step of the method of FIG. 6, a verification is sent to the requestor (customer) indicating that the request has been acknowledged. Next, in an eighth step, a payment is processed (verified) using the merchant CC. An acknowledgement is sent, in a ninth step, to the customer indicating that the payment has been received. At this point in time, the user of the mobile device has received credit from a new credit provider in real time when purchasing an item.

When the fifth step of FIG. 6 determines that the request is not for a merchant card sign up, the program flows moves to step ten where the request is sent to an appropriate payment system S1-S4. After step ten, step eleven of FIG. 6 sends the request and the user email and waits for acknowledgement from a payment system.

Figure 7:
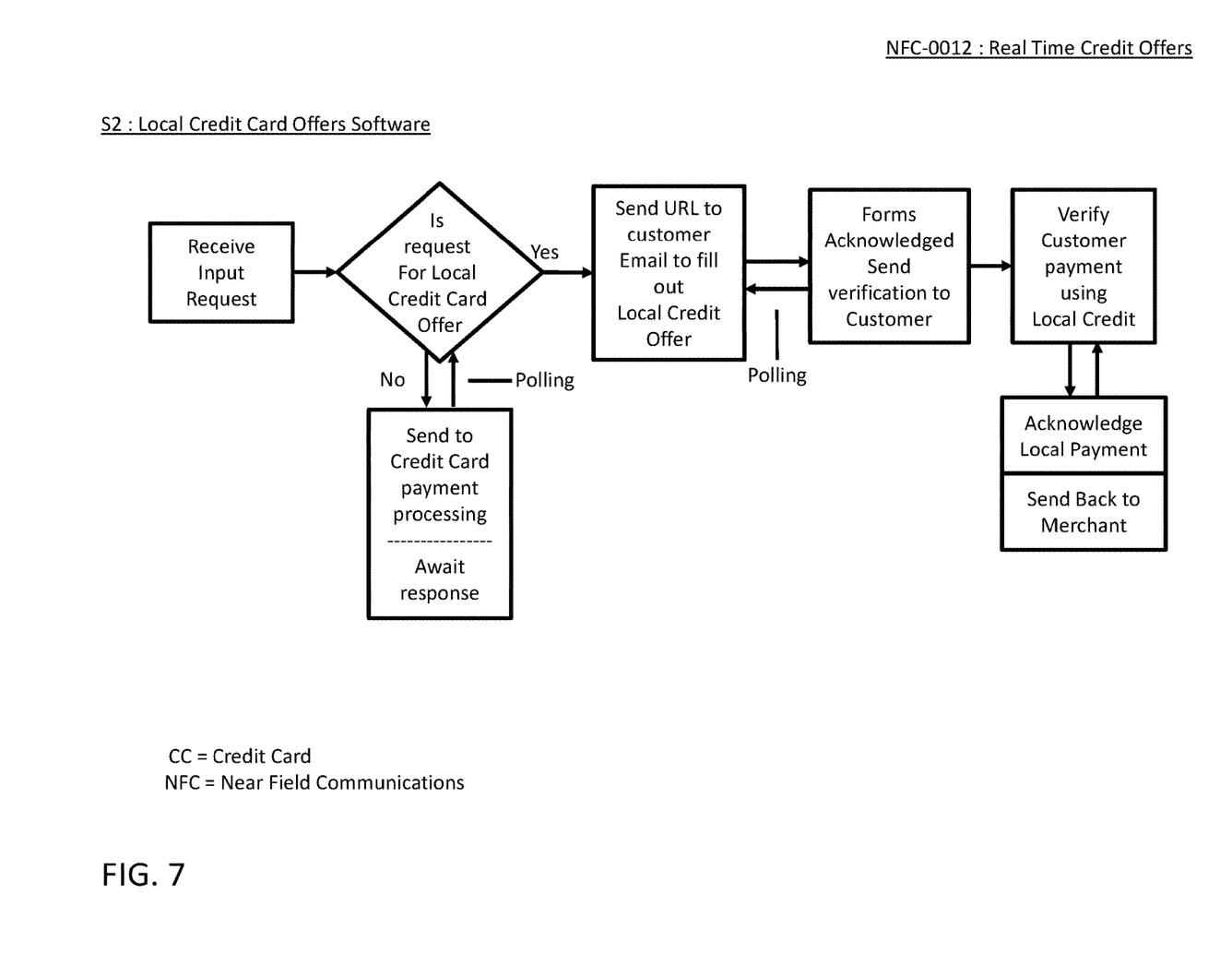
FIG. 7 illustrates an exemplary credit card offer methodology.

FIG. 7 illustrates an exemplary credit card offer methodology. A first step in FIG. 7 receives a request for credit from a mobile device. The second step of FIG. 7 determines whether the request is for a local credit card offering. When the request is for a local credit card, the program flow of FIG. 7 moves to a third step that sends a URL to the customer email address. The URL links to a local credit card application form. Once received, user (a customer) of the mobile device must fill out the application before they can be receive an electronic credit card from a local credit provider. In a fourth step of FIG. 7, an acknowledgement may be sent to the customer indicating that their credit application has been received. Then, in a fifth step of FIG. 7, a customer payment may be verified. The fifth step is where the user of the mobile device receives an electronic credit when the local credit provider pays to a purchase (verifies customer payment) made by the user. After the local credit provider pays for the purchase, an acknowledgement that the payment has been made is sent to the user mobile device.

When the request received in step two is not a request for a local credit card offer, the program flow moves to a step that may send information to a credit card processing center after which a response is waited form.

Figure 8:
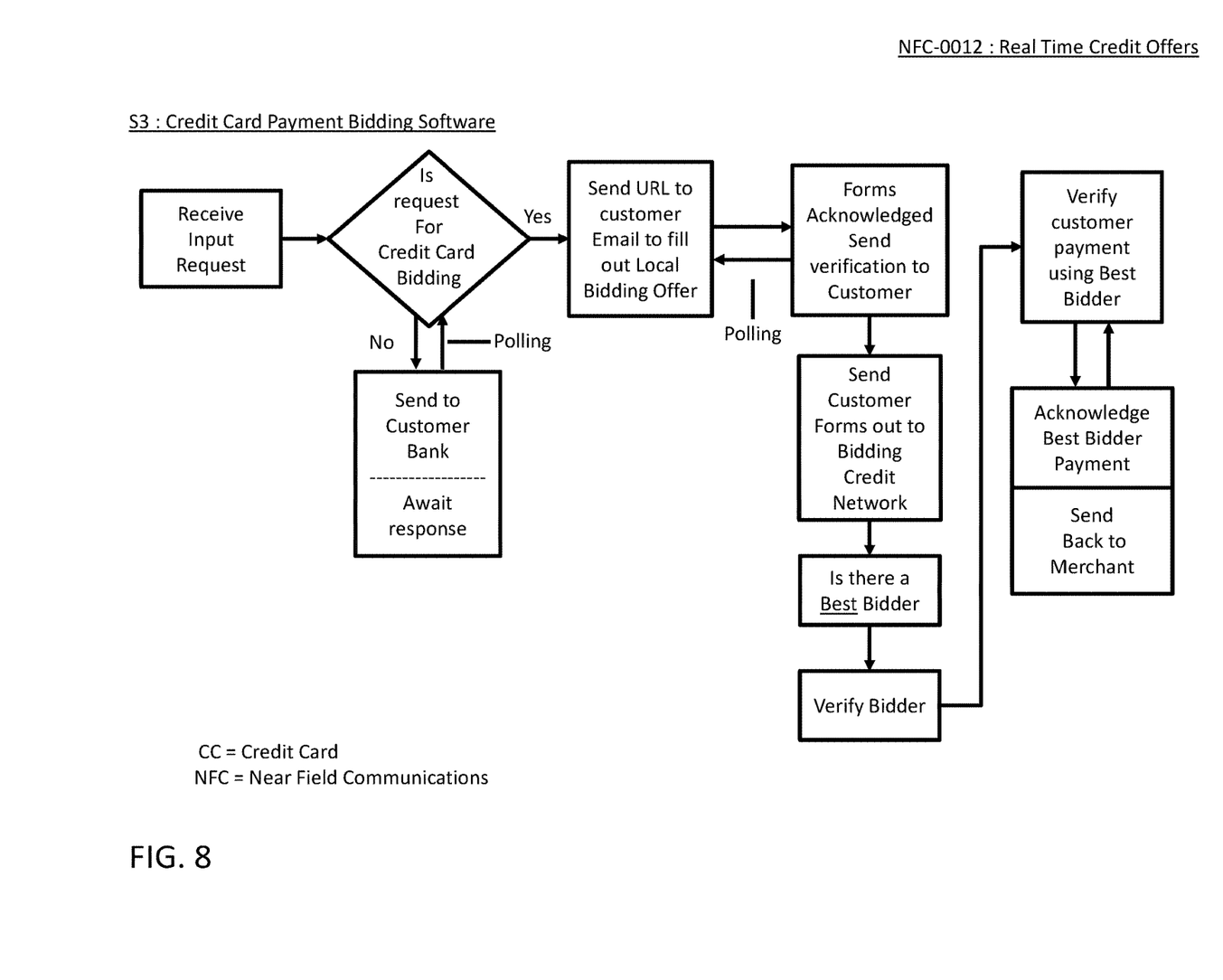
FIG. 8 illustrates an exemplary payment methodology.

FIG. 8 illustrates an exemplary payment methodology. In the first step of FIG. 8, input is received at a card bidding system. Then in a second step of FIG. 8, a determination is made as to whether the request is for a bidding card. When yes, the program flow moves to a third step where a URL is sent to the customer email address. The URL links to a website where a prospective customer may fill out a request to receive a credit card from a best bidder. In step four of FIG. 8, the credit card payment bidding software sends an acknowledgement that a credit card application forms have been received. Next, in a fifth step, the forms are sent to a bidding credit network. In a sixth step a best bidder is determined. After the best bidder has been determined, the bidder is verified in a seventh step of FIG. 8. Then a customer payment is paid (verified) by the best bidder. Then an acknowledgment that the payment has been made is sent to the user mobile device.

When step two of FIG. 8 determines that the request is not for a bidding credit card, the program flow moves to a step where the input request is sent to a customer bank to await a response.

Figure 9:
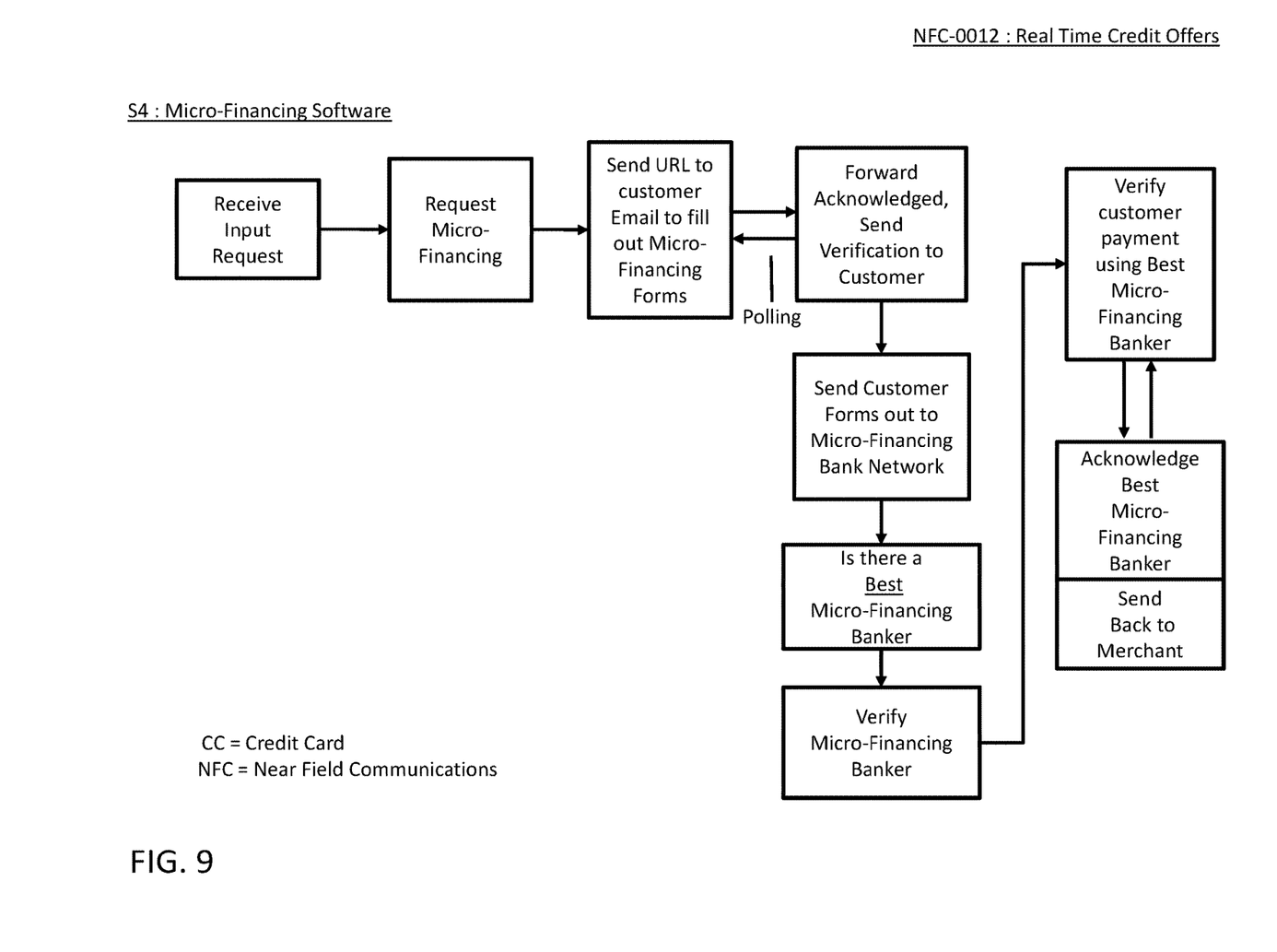
FIG. 9 illustrates an exemplary micro-finance methodology

FIG. 9 illustrates an exemplary micro-finance methodology. In the first step of FIG. 9, an input is received at a micro-financing system. Then in a second step of FIG. 9, a determination is made that the request is for micro-financing. Then the flow chart of FIG. 9 moves to a third step where a URL is sent to the customer email address. The URL links to a website where a prospective customer may fill out forms to receive a line of credit. In step four of FIG. 9, the micro-financing software sends an acknowledgement that a credit application forms have been received. Next, in step five, the forms are sent to a micro-financing credit network and a best micro-financer is determined in step six. After the best micro-financer has been determined, the micro-financer is verified in step seven. In step eight of FIG. 9, a customer payment is paid (verified) by the micro-financer. An acknowledgment is then sent to the user mobile device indicating that the payment has been made.

Figure 10:
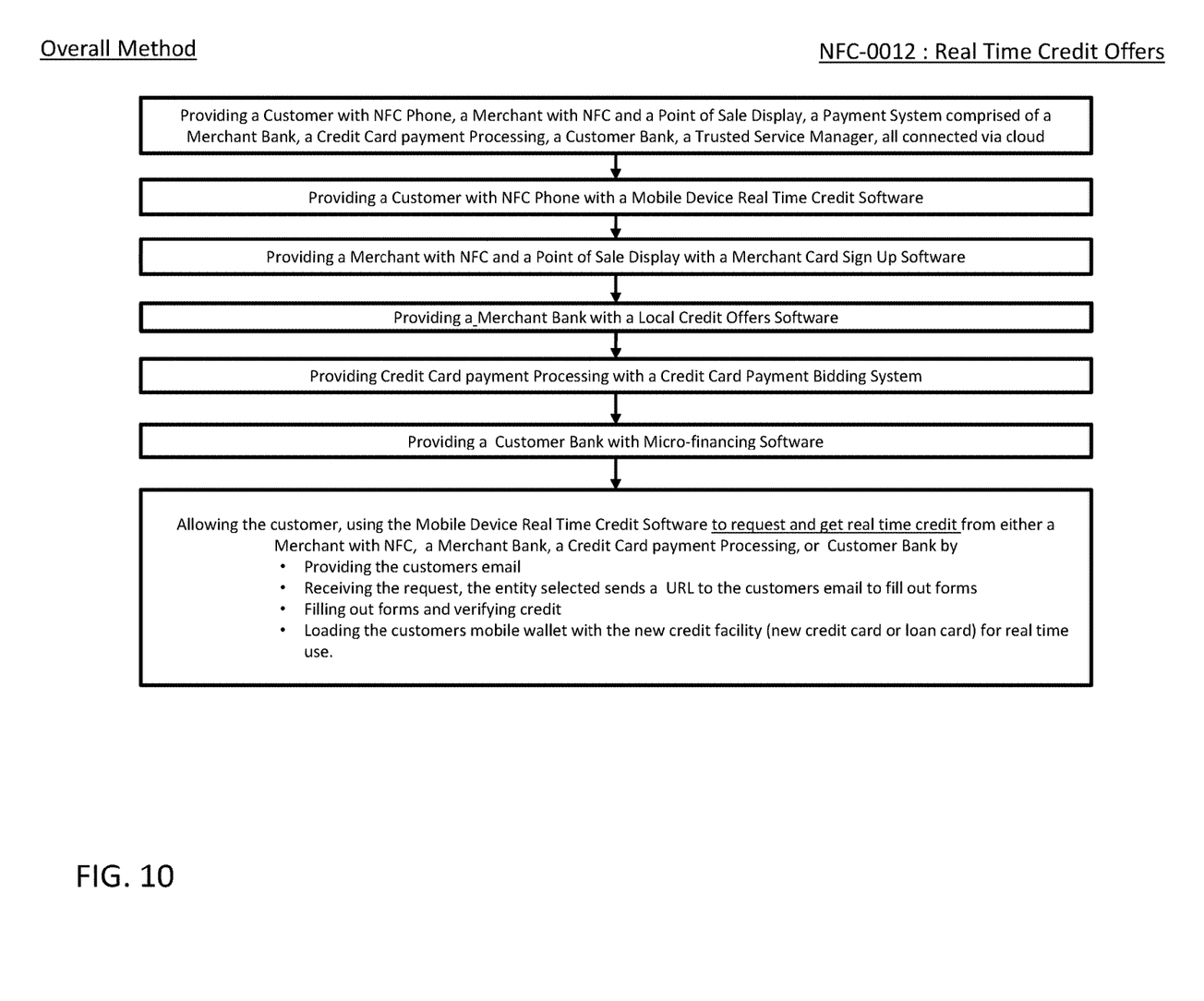
FIG. 10 illustrates a methodology consistent with the disclosure of the present invention.

FIG. 10 illustrates a methodology consistent with the disclosure of the present invention. The flow chart begins with a first step that may provide a customer with a phone equipped with a NFC data communication interface. This step may also provide a merchant with a point of sale display, provide a payment system of a merchant bank, provide a customer bank system with credit card processing capabilities, provide a trusted service provider system, and provide the ability for each of these systems to communicate over the cloud or internet.

In a second step of FIG. 10, the customer phone may be provided with mobile device real time credit software. Then, in step three, the merchant point of sale display may be provided with merchant card sign up software. Next, in step four of FIG. 10, a merchant bank may be provided with local credit offer software.

In the fifth step of FIG. 10, a credit card payment processing system may be provided with credit card payment bidding system software. Then, in step six, a customer bank may be provided with micro-financing software.

In step seven of FIG. 10, a customer may be allowed to request real time credit from a merchant using an NFC data communication interface. In this step, the customer may also be allowed to request credit from a merchant bank, from a credit card payment processing system, or from a customer bank. The customer may provide their email address, fill out a credit application form on a website identified by a URL, and receive a credit card or credit line (loan card) on their mobile device.

The present invention allows a user of a mobile device to request credit from one or more of a merchant, a merchant bank, a credit card processing center, a credit bidding network, or a micro-financer when the user is participating in a transaction with the merchant. The credit may be granted to the user in real time and the credit provider will pay for the transaction while the user is at the merchant.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for verifying eligibility for real-time service offers, the method comprising:
    initiating a transaction between a mobile device and a terminal over a contactless interface, wherein the mobile device is associated with a profile indicating a user locale;
    receiving one or more service offers in real-time over a communication network, wherein each of the real-time service offers is associated with a corresponding service that is local to the indicated user locale and for which a user of the mobile device is identified as eligible;
    transmitting information over the communication network indicating that one of the real-time service offers is selected, wherein the selected offer is associated with an identified service that is not yet associated with the mobile device;
    modifying the transaction based on the selected offer, wherein modifying the transaction comprises associating the identified service with the user of the mobile device; and
    downloading information regarding the identified service onto the mobile device, wherein the downloaded information reflects that the identified service is approved for the user of the mobile device in accordance with the modified transaction.

2. The method of claim 1, further comprising polling one or more offer devices over the communication network upon initiating the transaction, wherein the received offers are responsive to the polling.

3. The method of claim 2, wherein polling the one or more offer devices is based on at least one type of offer.

4. The method of claim 1, further comprising receiving the profile via a user interface of the mobile device, wherein the profile further includes information specifying at least one type of offer.

5. The method of claim 1, further comprising receiving a custom uniform resource locator (URL) associated with the selected offer.

6. The method of claim 5, wherein modifying the transaction is further based on selection of the custom URL.

7. The method of claim 1, further comprising receiving a subsequent request for the identified service, and processing the subsequent request based on the downloaded information reflecting that the identified service has been approved for the user of the mobile device.

8. The method of claim 1, further comprising receiving a subsequent request for a different service, wherein a provider of another service declines to provide the different service to the user of the mobile device, and wherein the terminal receives a message indicating that the different service is declined.

9. The method of claim 1, wherein modifying the transaction further includes settling an amount of funds with a payment source associated with the user of the mobile device.

10. A device for verifying eligibility for real-time service offers, the device comprising:
    a contactless interface that initiates a transaction between a mobile device and a terminal, wherein the mobile device is associated with a profile indicating a user locale;
    a communication network interface that communicates over a communication network, wherein the communication interface:
        receives one or more service offers in real-time, wherein each of the real-time service offers is associated with a corresponding service that is local to the indicated user locale and for which a user of the mobile device is identified as eligible; and
        transmits information indicating that one of the real-time service offers is selected, wherein the selected offer corresponds to an identified service that is not yet associated with the mobile device; and
    a processor that executes instructions stored in memory, wherein execution of the instructions by the processor modifies the transaction based on the selected offer, wherein modifying the transaction comprises associating the identified service with the user of the mobile device;
    wherein the communication network interface downloads information regarding the identified service, and wherein the downloaded information reflects that the identified service has been approved for the user of the mobile device in accordance with the modified transaction.

11. The device of claim 10, wherein the communication network interface further polls one or more offer devices over the communication network upon initiation of the transaction, wherein the received offers are responsive to the polling.

12. The device of claim 11, wherein the communication network interface polls the one or more offer devices based on at least one type of offer.

13. The device of claim 10, further comprising a user interface that receives the profile, wherein the profile further includes information specifying at least one type of offer.

14. The device of claim 10, wherein the communication interface further receives a custom uniform resource locator (URL) associated with the selected offer.

15. The device of claim 14, wherein the processor modifies the transaction further based on selection of the custom URL.

16. The device of claim 10, wherein the communication interface further receives a subsequent request for the approved service, and wherein the processor processes the subsequent request based on the downloaded information indicative of having been approved for the user of the mobile device.

17. The device of claim 10, wherein the communication network interface further receives a subsequent request for another service, wherein a provider of the other service declines to provide the other service to the user of the mobile device, and wherein the terminal receives a message indicating that the other service is declined.

18. The device of claim 10, wherein the processor modifies the transaction to further include settling an amount of funds with a payment source associated with the user of the mobile device.

19. A non-transitory computer-readable storage medium, having embodied thereon a program executable by a processor to perform a method for verifying eligibility for real-time service offers, the method comprising:
   initiating a transaction between a mobile device and a terminal over a contactless interface, wherein the mobile device is associated with a profile indicating a user locale;
   receiving one or more service offers in real-time over a communication network, wherein each of the real-time service offers is associated with a corresponding service that is local to the indicated user locale and for which a user of the mobile device is identified as eligible;
   transmitting information over the communication network indicating that one of the real-time service offers is selected, wherein the selected offer is associated with an identified service that is not yet associated with the mobile device;
   modifying the transaction based on the selected offer, wherein modifying the transaction comprises associating the identified service with the user of the mobile device; and
   downloading information regarding the identified service onto the mobile device, wherein the downloaded information reflects that the identified service is approved for the user of the mobile device in accordance with the modified transaction.

* * * * *